(12) United States Patent
Moran et al.

(10) Patent No.: US 12,339,974 B2
(45) Date of Patent: Jun. 24, 2025

(54) METHODS AND APPARATUS FOR PROVISIONING A DEVICE

(71) Applicant: Arm Limited, Cambridge (GB)

(72) Inventors: Brendan James Moran, Histon (GB); Hanno Becker, Cambridge (GB)

(73) Assignee: Arm Limited, Cambridge (GB)

( * ) Notice: Subject to any disclaimer, the term of this patent is extended or adjusted under 35 U.S.C. 154(b) by 192 days.

(21) Appl. No.: 17/565,079

(22) Filed: Dec. 29, 2021

(65) Prior Publication Data

US 2023/0205895 A1 Jun. 29, 2023

(51) Int. Cl.
| | |
|---|---|
| *G06F 21/60* | (2013.01) |
| *G06F 21/10* | (2013.01) |
| *G06F 21/57* | (2013.01) |
| *G06F 21/64* | (2013.01) |

(52) U.S. Cl.
CPC .......... *G06F 21/602* (2013.01); *G06F 21/572* (2013.01); *G06F 21/64* (2013.01); *G06F 21/107* (2023.08)

(58) Field of Classification Search
CPC ...... G06F 21/602; G06F 21/572; G06F 21/64; G06F 21/107; G06F 21/57; G06F 21/575; G06F 21/74
See application file for complete search history.

(56) References Cited

U.S. PATENT DOCUMENTS

| | | | | |
|---|---|---|---|---|
| 10,602,353 B1* | 3/2020 | Berdy | ............... | H04W 12/35 |
| 2006/0075077 A1* | 4/2006 | Brookner | ............... | G06F 21/57 |
| | | | | 709/220 |
| 2010/0287547 A1* | 11/2010 | Korkishko | ............ | H04W 12/10 |
| | | | | 717/177 |
| 2012/0137137 A1* | 5/2012 | Brickell | ................. | G06F 21/73 |
| | | | | 713/182 |
| 2014/0208105 A1* | 7/2014 | Carapelli | ................ | G06F 21/57 |
| | | | | 713/168 |
| 2014/0250215 A1* | 9/2014 | Bowen | ................ | H04L 41/0895 |
| | | | | 709/223 |
| 2014/0380432 A1* | 12/2014 | Niu | ..................... | G06F 21/6272 |
| | | | | 726/4 |

(Continued)

OTHER PUBLICATIONS

Zhang Z, Pei Q, Ma J, Yang L. Implementing trustworthy dissemination of digital contents by using a third party attestation proxy-enabling remote attestation model. In2008 International Conference on MultiMedia and Information Technology Dec. 30, 2008 (pp. 322-325). IEEE. (Year: 2008).*

*Primary Examiner* — Michael R Vaughan
*Assistant Examiner* — Ethan V Vo
(74) *Attorney, Agent, or Firm* — NIXON & VANDERHYE P.C.

(57) ABSTRACT

Aspects of the present disclosure relate to an apparatus comprising interface circuitry to interface with a device that is to be provisioned by the apparatus; and secure enclave circuitry. The secure enclave circuitry is configured to: maintain provisioning data with which the device is to be provisioned; establish a secure connection with the device; perform, with the device and via the secure connection, an attestation process in respect of said provisioning data; and subsequent to successfully completing said attestation process, provisioning the device with the provisioning data, via the secure connection.

14 Claims, 7 Drawing Sheets

(56) References Cited

U.S. PATENT DOCUMENTS

| | | | | |
|---|---|---|---|---|
| 2015/0121072 A1* | 4/2015 | Choi | .................. | G06F 21/57 |
| | | | | 713/168 |
| 2015/0277930 A1* | 10/2015 | Sarangdhar | ........... | G06F 21/572 |
| | | | | 713/2 |
| 2018/0176229 A1* | 6/2018 | Bathen | .................. | H04L 9/3239 |
| 2019/0207813 A1* | 7/2019 | Uehara | .................. | G06F 21/64 |
| 2019/0268308 A1* | 8/2019 | Sinha | .................. | G06F 21/64 |
| 2020/0026857 A1* | 1/2020 | Muller | .................. | G06F 21/12 |
| 2020/0304299 A1* | 9/2020 | Medvinsky | ........... | H04L 9/0844 |
| 2020/0344075 A1* | 10/2020 | Gremaud | ............. | H04L 9/0894 |
| 2021/0203649 A1* | 7/2021 | Touitou | ................. | G06F 21/44 |
| 2021/0328971 A1* | 10/2021 | Bandi | .................... | G06F 21/53 |
| 2021/0374232 A1* | 12/2021 | Bursell | ............... | G06F 21/6218 |
| 2023/0088197 A1* | 3/2023 | Cline | .................... | G06F 21/57 |
| | | | | 713/187 |
| 2023/0142278 A1* | 5/2023 | Elbert | .................. | G06F 21/121 |
| | | | | 725/31 |

\* cited by examiner

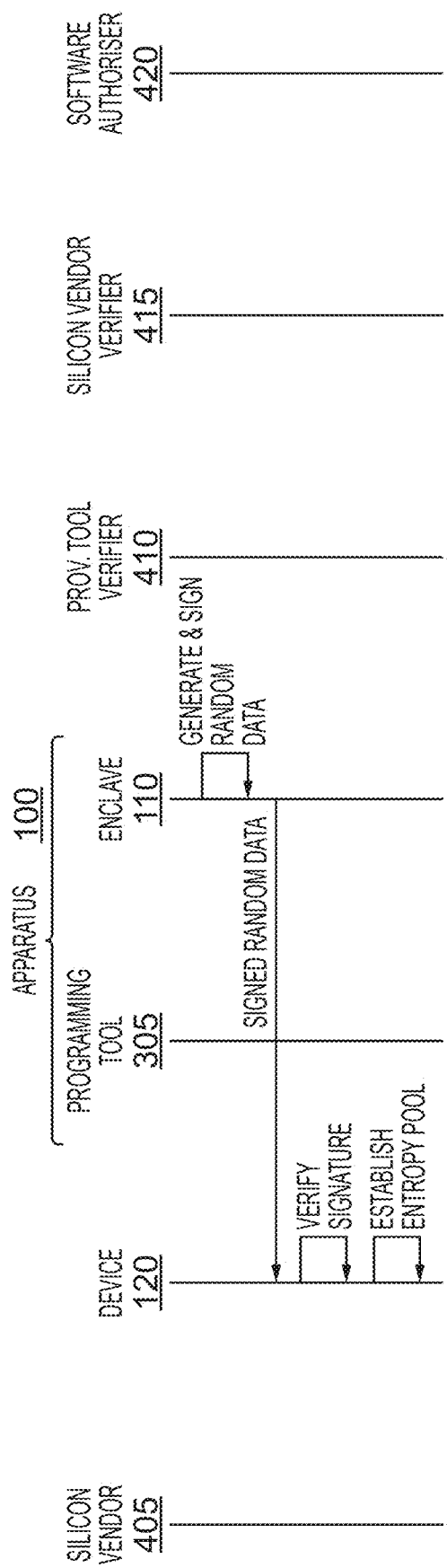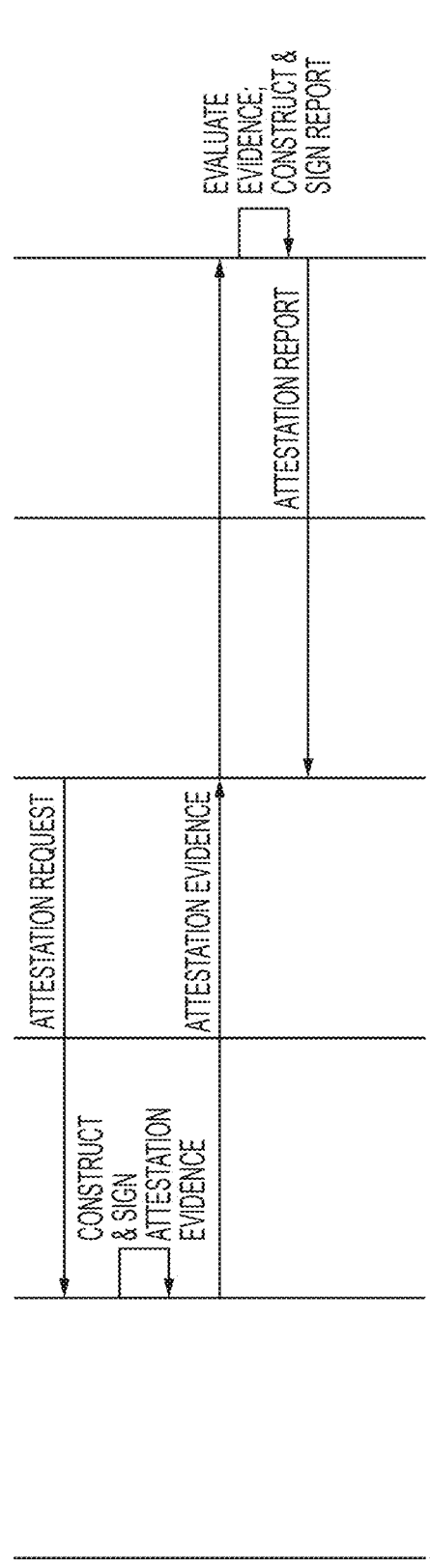
FIG. 4B
FIG. 4C

METHODS AND APPARATUS FOR PROVISIONING A DEVICE

BACKGROUND

The present technique relates to the field of provisioning of computing devices. Such provisioning may comprise provisioning the device with provisioning data, for example firmware or software which is to be installed onto the device. The provisioning may be performed as part of a manufacturing or configuration process.

In such situations, it is often the case that the provisioned device should be trusted. For example, the device may be a processor for a computer or smartphone, which the user should be able to trust does not include malicious functionality. However, the apparatus performing the provisioning may not be trusted. For example, the factory manufacturing a device may not be trusted to not compromise the functioning of the device, for example by installing malicious functionality such as a backdoor, or by making an illicit copy of supposedly secure cryptographic credentials.

This is further complicated because in some systems, even if the bulk of the device functionality is provisioned by way of a secure firmware image with which the manufacturer cannot tamper, there may be some data (such as cryptographic credentials, a device identifier, trust details for certificate authorities, and so on) which varies and thus cannot form part of the firmware image.

There is therefore a desire for a way of provisioning a device such that it can be trusted, even if the provisioning is performed by an un-trusted apparatus.

SUMMARY

At least some examples provide an apparatus comprising:
interface circuitry to interface with a device that is to be provisioned by the apparatus;
secure enclave circuitry to:
  maintain provisioning data with which the device is to be provisioned;
  establish a secure connection with the device;
  perform, with the device and via the secure connection, an attestation process in respect of said provisioning data;
  subsequent to successfully completing said attestation process, provisioning the device with the provisioning data, via the secure connection.
Further examples provide a method comprising:
establishing a connection with secure enclave circuitry of a provisioning apparatus;
performing, with the secure enclave and via the connection, an attestation process in respect of provisioning data to be received from the secure enclave;
subsequent to successfully completing said attestation process, receiving the provisioning data via the secure connection; and
installing the provisioning data.
Further examples provide a system comprising:
an apparatus as described above; and
a device, configured to perform the method described above.

Further aspects, features and advantages of the present technique will be apparent from the following description of examples, which is to be read in conjunction with the accompanying drawings.

BRIEF DESCRIPTION OF THE DRAWINGS

FIGS. 4A to 4D depict methods according to examples of the present disclosure.

DESCRIPTION OF EXAMPLES

Figure 1:
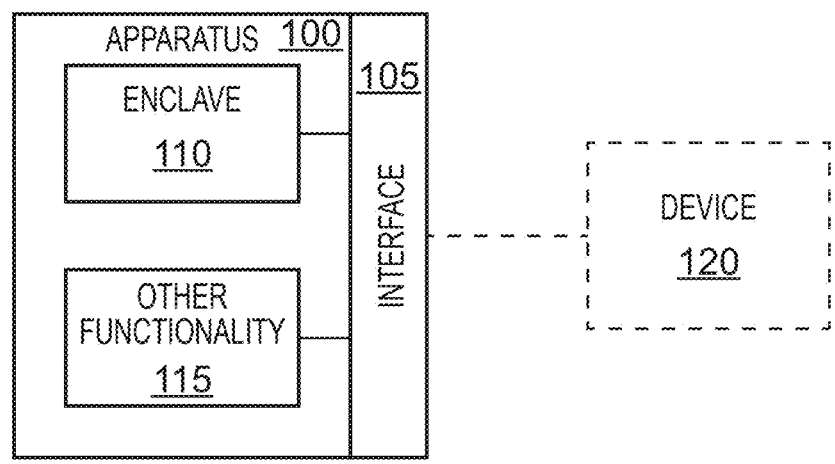
FIG. 1 schematically depicts an apparatus and a device according to an example.

In an example, an apparatus for provisioning a device is provided. The device may be a device which performs processing, such as a phone or computer, or an element thereof such as processing circuitry.

The apparatus comprises interface circuitry to interface with a device that is to be provisioned by the apparatus. The interface circuitry may for example be a bus interface such as universal serial bus (USB). The device may be to be provisioned by the apparatus as part of an initial configuration process of the device. For example, the provisioning may be to install firmware and/or initial data values which set up aspects of the functionality of the device.

The apparatus further comprises secure enclave circuitry. The secure enclave circuitry provides processing functionality which is physically or conceptually separate from the rest of the functionality of the apparatus, for example implemented by way of Arm Trustzone or Confidential Compute Architecture (CCA) functionality. This physical or conceptual separation allows assurance that the secure enclave will function in a trusted and expected manner, regardless of whether the other functionality of the apparatus is trusted. For example, it may be hardwired into the apparatus during the silicon fabrication process.

The secure enclave circuitry is configured to maintain provisioning data with which the device is to be provisioned. Per the comment above, the provisioning data may be firmware, which defines relatively low-level functionality of the device. Alternatively or additionally, the provisioning data may comprise data values for initialising the device, such as cryptographic credentials, a device identifier, information about where the device should attempt to connect when first booted, and/or trust details for certificate authorities.

As particular examples of cryptographic data, the provisioning data may comprise at least one cryptographic key to be used by the device. Alternatively or additionally, the provisioning data may comprise cryptographic entropy data to be used by the device to generate at least one cryptographic key such as a device-specific private key. This provision of entropy may be used in examples in which devices are to randomly generate their own device-specific private keys. Without externally-provided entropy, a situation could arise in which multiple devices end up generating the same private key for themselves, because they lack true random number generation capability and thus, given the same initial conditions, they "randomly" generate the same key. The provision of external entropy averts this. However, if the source of the entropy is not trustworthy, there is a risk that the provision could be tampered with (for example by providing the same entropy data to each device, thereby undoing the advantages). The present method allows for this source to be trusted.

Some or all of the provisioning data may for example be provided to the secure enclave circuitry by a designer or manufacturer of the device. In other examples, the secure enclave circuitry (e.g. an app running thereon) generates the provisioning data itself.

The secure enclave circuitry is configured to establish a secure connection with the device. For example, this may be by way of a secure communication channel between the secure enclave circuitry and the device, the content of which is not accessible to elements of the apparatus external to the secure enclave circuitry. In the example in which the provisioning data comprises cryptographic entropy data, the secure channel may be authenticated but not confidential: breaking a device-generated key generated based on this entropy in combination with local entropy is no easier than breaking a confidential connection which was established based on local entropy alone.

The secure enclave is configured to perform, with the device and via the secure connection, an attestation process in respect of said provisioning data. Examples of such attestation processes are described in more detail below. The attestation process allows the secure enclave circuitry to attest to the device that it is functioning as expected, and/or that the provisioning data has not been tampered with. This allows the device to trust that the secure enclave circuitry is not behaving in a malicious manner and can thus be trusted, regardless of whether the other functionality of the apparatus is trusted or not.

Subsequent to successfully completing the attestation process (i.e. once the device has been assured that the secure enclave circuitry can be trusted), the secure enclave circuitry provisions the device with the provisioning data, via the secure connection.

In this manner, the device can be securely and trustworthily provisioned, regardless of whether the apparatus as a whole is trusted. The end user of the device can thus be confident that the device will function as expected, that it does not contain any malicious functionality such as a hidden back door, and that the provisioning data has not been tampered with.

Various attestation processes can be used within the process described above. In some examples, the secure enclave process performs the attestation process responsive to an attestation request received from the device. The functionality to perform this request may be hardwired into the device. The device may be configured to block the provisioning until the attestation process has been completed (and/or in response to a failed attestation process), to ensure that the provisioning can only occur once it has been established that the secure enclave circuitry can be trusted.

In an example, as part of the attestation process, the secure enclave circuitry generates attestation evidence data indicative of the provisioning data. The evidence data may represent the content of the provisioning data, for example by way of a hash or digest. If the provisioning data has been tampered with, this would thus be evident in the evidence data. Alternatively or additionally, in examples in which the secure enclave circuitry is configured to generate the provisioning data, the evidence data may comprise data indicative of (e.g. a hash of) the computer instructions which will be executed by the secure enclave circuitry to generate the provisioning data.

The secure enclave circuitry transmits the attestation evidence data to an attestation verification entity, for example via a secure communication channel. This may for example be the trusted third-party attestation verifier, such as a service provided by a designer or manufacturer of the device and/or apparatus. The attestation verification entity can be trusted by the device.

The secure enclave circuitry receives, from the attestation verification entity, attestation verification data in respect of the attestation evidence data. The verification data indicates that the evidence data has been verified by the verification entity, such that the content of the provisioning data can be trusted. Conversely, a failed verification may be indicated by explicit verification fail data, or by a lack of verification data. At least part of the verification data may be cryptographically signed by the verification entity, so that its origin and lack of tampering is assured. In some examples, the verification entity may sign only a public key of the secure enclave circuitry and an attestation request, since this is sufficient to both verify the secure enclave circuitry and establish a secure connection thereto.

The secure enclave circuitry then transmits the attestation evidence data to the device. This confirms to the device that the provisioning data is bona fide, so that the device can trust that the provisioning process can be safely performed. The functionality to verify this may be hardwired into the device, or may be installed (prior to the presently-described process) by a trusted entity.

This example allows the attestation process to be performed even if the device has no network connection (indeed, potentially no external connection other than its connection to the interface circuitry of the apparatus). In other examples, the device may have its own network connection independent of the apparatus. In such examples, the device may communicate with the attestation verification entity directly, rather than via the apparatus. For example, the secure enclave circuitry may transmit the attestation evidence data to the device, which the device can verify with the verification entity.

The above example provides a way for the secure enclave circuitry to attest its legitimacy to the device. Alternatively or additionally, it may be desirable for the device to attest its legitimacy to the secure enclave circuitry. For example, this may provide assurance to the secure enclave circuitry that the device is a genuine device, and not for example a simulator that has been illicitly connected to apparatus to obtain information about the provisioning process/data. In such an example, the secure enclave circuitry may be configured to perform, with the device, an attestation process in respect of the device. This contrasts with the previously-described attestation process, which was performed in respect of the secure enclave circuitry. The secure enclave circuitry may decline to perform the provisioning process until the attestation process in respect of the device is complete.

As part of an example of such an attestation process in respect of the device, the secure enclave circuitry receives attestation evidence from the device, the attestation evidence being indicative of functionality of the device. For example, the attestation evidence may be a hash or digest of the contents of a storage within the device, or a subset of such storage (for example data which identifies the device). The attestation evidence thus provides evidence that the device is what it purports to be.

The secure enclave circuitry transmits the attestation evidence to an attestation verification entity. This behaves analogously to the previously described attestation entity, and may be the same entity or a different entity.

The secure enclave circuitry receives, from the attestation verification entity in response to the attestation evidence, attestation verification data in respect of the attestation evidence data. As for the case described above, the attestation verification data indicates that the verification entity has verified the attestation evidence. Upon receiving this, the secure enclave circuitry can therefore be assured that the device is legitimate.

In an example, the apparatus comprises device programming circuitry. The device programming circuitry is configured to provision the device with functionality data. This data may define secure connection functionality to establish the above-described secure connection with the apparatus. Alternatively or additionally, the functionality data may define attestation functionality to perform one or both of the above-described attestation processes with the apparatus.

The functionality data, which may comprise at least one of a firmware image, a read-only memory (ROM) image and a bootloader, thus provides the device with the functionality to perform its side of the attestation and provisioning processes described above. The provisioning with the functionality data may thus be performed before the above-described attestation and provisioning processes.

The device programming circuitry may be external to the secure enclave circuitry (in particular because it may communicate with the device before the device has secure connection functionality). However, as explained above, the apparatus as a whole may not be trusted. This can be addressed by making the functionality data verifiable, by the device, based on verification data stored by the device. For example, the functionality data may be verifiable by way of a public key that is hard-coded into the device at manufacture (e.g. by way of the functionality data being signed such that the public key can be used for verification). The device can thus trust the functionality data, even if the apparatus (or more specifically the device programming circuitry) from which it is received is not trusted.

In an example, a method is provided, which may be performed by a device as described above.

Initially, a connection is established with secure enclave circuitry of a provisioning apparatus, which may for example be the apparatus described above.

An attestation process is then performed with the secure enclave circuitry, via the connection. The attestation is in respect of provisioning data to be received from the secure enclave. The attestation may be as described above. In examples, the device may be responsive to a failure of the attestation process to block installation of the provisioning data. For example, the device may decline to permit the provisioning process to be performed until it has received attestation verification data in respect of the secure enclave circuitry.

Subsequent to successfully completing the attestation process, the provisioning data is received via the secure connection, and installed. In this manner, the device can be provisioned and trusted, even if the provisioning apparatus as a whole is not trusted.

In an example, the provisioning data comprises entropy provisioning data, and the method comprises generating local entropy data and generating a cryptographic key based on the entropy provisioning data and the local entropy data. As explained above, this combination of local and external entropy data allows for improved entropy in the generated key. In particular, it avoids the situation in which multiple devices generate the same or similar keys as a consequence of having the same or similar starting conditions. The present method allows this external entropy to be trusted to be genuine and legitimate, such that the key generation process is trustworthy.

The generated cryptographic key can then be used to establish a secure connection with the secure enclave circuitry, which may then be used for transmission of other provisioning data.

In an example, the device is configured to receive, from device programming circuitry of the provisioning apparatus, functionality data as described above. The device can then install the functionality to permit performance of the corresponding functionality. This provides an effective way of configuring the device to perform the functionality described above. As also described above, the device may verify the functionality based on pre-stored verification data, thereby providing a reliable way for the device to trust that the functionality data is legitimate and has not been tampered with. The verification data may be received and pre-stored (for example into a hard-coded read-only storage) as part of a manufacturing process prior to communication with the provisioning apparatus. The verification data may be received from a trusted entity such as a designer or manufacturer of the device.

Examples of the present disclosure will now be described with reference to the drawings.

FIG. 1 schematically shows an apparatus 100. The apparatus may for example be implemented by dedicated circuitry, or by conceptual elements of general purpose circuitry such as a processor. The apparatus 100 is for provisioning a device 120. The device 120 is a computing device such as a computer or phone (or part of one).

The apparatus 100 comprises an interface 105 for communicating with the device. The interface may implement a bus such as Universal Serial Bus (USB).

The interface is communicatively coupled to a secure enclave 110. The secure enclave 110 is hardcoded to act in a reliable and trustable way: even if the apparatus 100 as a whole is not trusted, the functioning of the enclave 110 can be trusted.

The apparatus 100 also comprises other functionality 115, which can be communicatively coupled to the interface 105. This other functionality 115, unlike the enclave 110, is not necessarily trusted.

Various methods will now be described by which the apparatus 100 can provision the device 100 in a trustworthy manner, despite not (as a whole) being trusted.

Figure 2A:
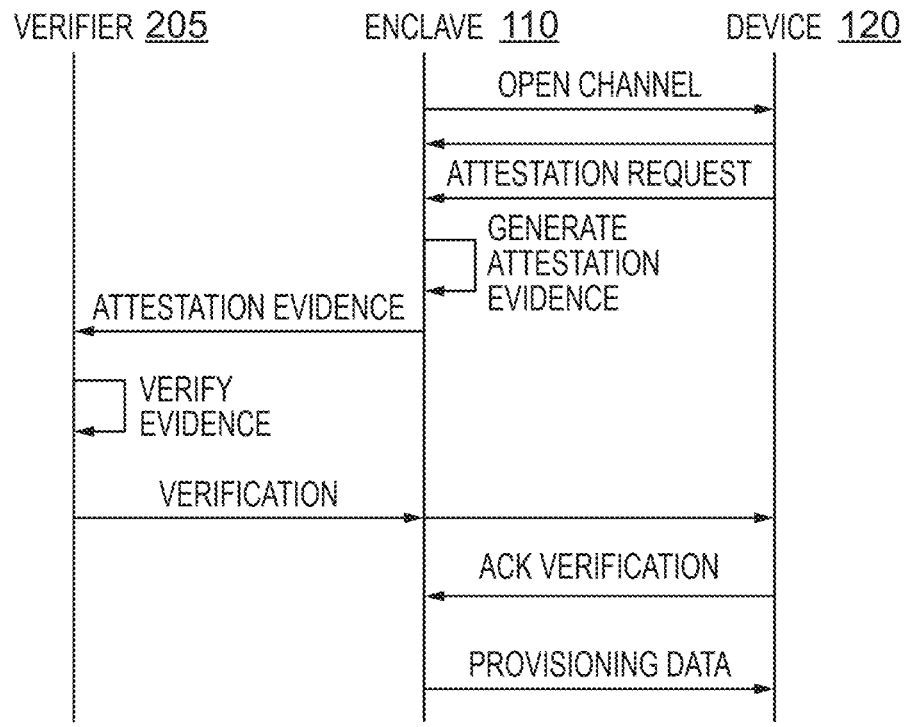
FIGS. 2A and 2B depict methods that can be performed by the apparatus and the device of FIG. 1.
Figure 2B:
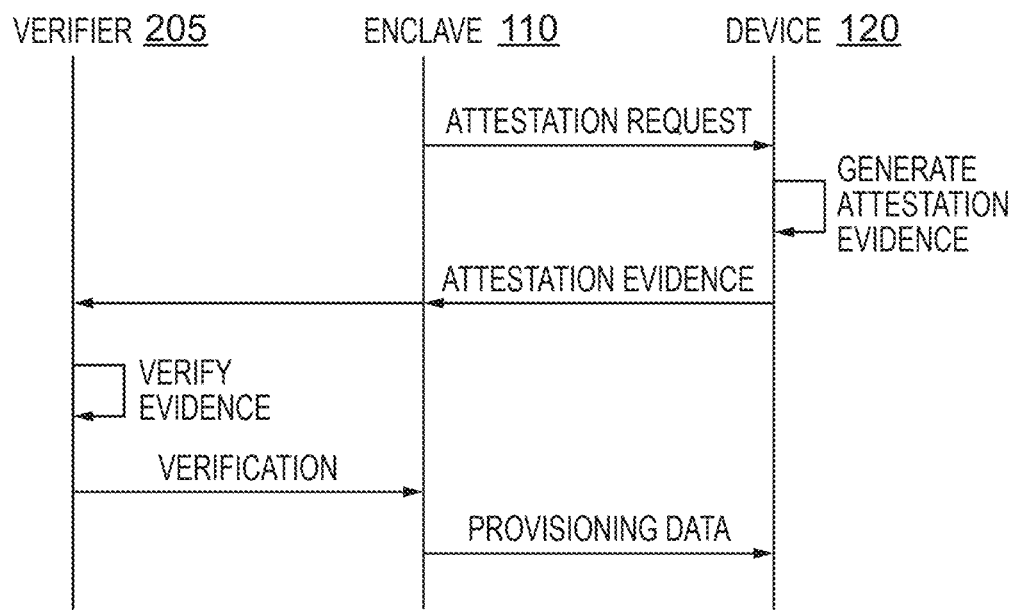

FIGS. 2A and 2B illustrate attestation methods that can be used by the apparatus 100 and device 120 of FIG. 1, in order to verify trust therein. In each case, the apparatus 100 is to trustworthily provision the device 120 with provisioning data (for example configuration data), even though (at the outset) the apparatus 100 and device 120 do not trust each other.

FIG. 2A illustrates a method including attestation in respect of the secure enclave 110 of the apparatus 100. This allows it to be trusted that the device 120 will receive legitimate, untampered provisioning data. In this figure it is assumed that the enclave 110 already maintains the provisioning data, either by having previously received it from elsewhere, or by having generated it. Methods for providing the provisioning data to the enclave 110 are described in more detail elsewhere in the present description. In addition to the enclave 110 and device 120, FIG. 2A shows a verifier 205. This is a third party entity, which is trusted by the enclave 110 and by the device 120. The verifier 205 may be a service that is provided by a designer or manufacturer of the apparatus 100 and/or the device 120.

The enclave 110 and device 120 open a communication channel, allowing communication therebetween. For example, this may involve handshake and/or setup messages using techniques known to a skilled person in the art.

The device 120 transmits an attestation request to the enclave 110. In response to this, the enclave 110 generates attestation evidence. This may be a hash of the provisioning data, or of instructions which the enclave 110 will execute to generate the provisioning data.

The enclave 110 transmits the attestation evidence to the verifier 205. The verifier 205 verifies the attestation evidence, and transmits a verification confirmation to the enclave 110; the enclave 110 forwards this to the device 120. The verification may be signed by the verifier, so that the device 120 can be assured of its authenticity.

In response to receiving the verification, the device 120 transmits an acknowledgement to the enclave. The enclave 110 then provisions the device 120 with the provisioning data.

This method allows the device 120 to trust that the provisioning data is legitimate, even if the apparatus 100 as a whole is not trusted. The device 120 may block the provisioning process until the verification from the verifier 205 has been received.

FIG. 2B illustrates a method including attestation in respect of the device 120. This allows the enclave 110 to trust that it is providing provisioning data to a legitimate device. This method may be combined with the method of FIG. 2A. For brevity, the opening of a channel between the enclave 110 and device 120 is not shown, but this can proceed similarly to the opening of the channel in FIG. 2A.

The enclave 110 transmits an attestation request to the device 120. In response, the device 120 generates attestation evidence. This may for example be data indicative of an identity and/or configuration or the device 120, and/or a hash or digest of the same. The attestation evidence serves to prove that the device 120 is what it purports to be.

The device 120 transmits the evidence to the enclave 110 which forwards it on to the verifier 205. The verifier 205 may be the same as the verifier 205 of FIG. 2A. Alternatively, the verifiers may be different. For example, the verifier of FIG. 2A may be a service provided by the designer or manufacturer of the apparatus 100, and the verifier of FIG. 2B may be a service provided by the designer or manufacturer of the device 120.

The verifier 205 verifies the attestation evidence and, responsive to a successful verification, transmits a verification message to the enclave 110. An unsuccessful verification may be indicated by a failure message, or by a mere lack of the verification message.

On receiving the verification message, the enclave 110 can trust that the device 120 is legitimate. It then transmits the provisioning data to the device 120.

Figure 3:
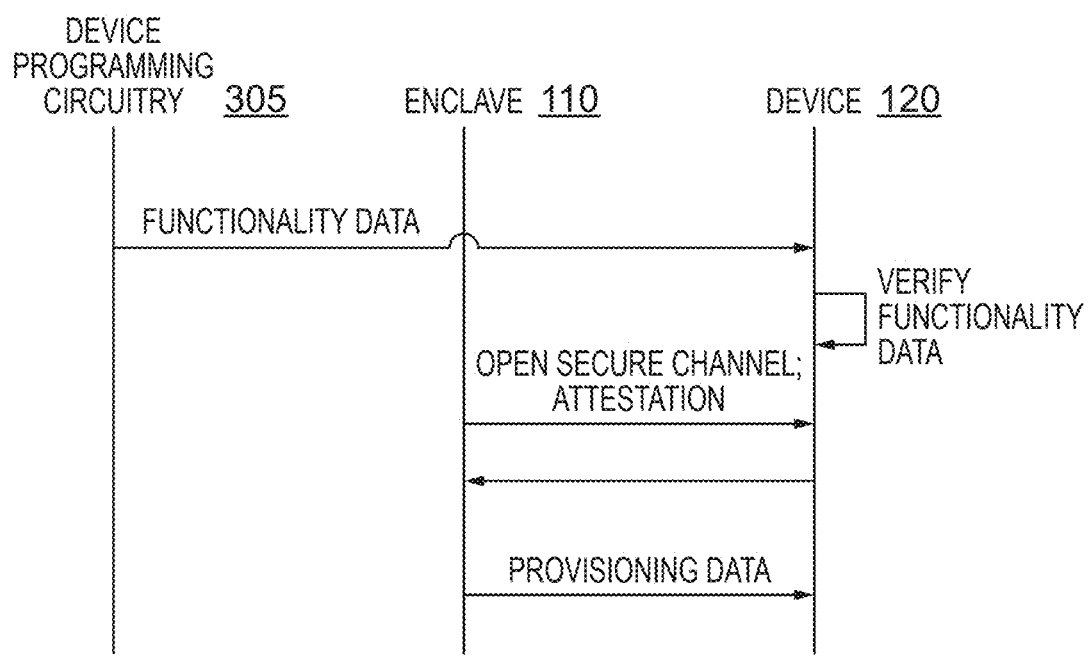
FIG. 3 depicts a method for providing functionality data from the apparatus to the device of FIG. 1.

FIG. 3 depicts a method which may be performed by the apparatus 100 and device 120, in order to provide functionality data to the device 120. For example, the functionality data may include firmware or software to enable the device 120 to perform its part of the methods of FIGS. 2A and 2B. FIG. 3 shows a communication flow between the enclave 110 of the apparatus 100, the device 120, and device programming circuitry 305 of the apparatus 100. The device programming circuitry 305 forms part of the "other functionality" 115 of the apparatus 100. It is therefore untrusted by the device 120.

The device programming circuitry 305 transmits functionality data to the device 120. The device 120 verifies the functionality data, for example by comparing aspects of the functionality data with expected values which were provided to the device 120 by a trusted entity, prior to the present method. Thus, the device 120 can verify the functionality data as trustworthy, even if the device programming circuitry 305 is not trusted.

Following verification of the functionality data, the enclave 110 and device 120 open a secure communication channel, and perform an attestation method. The attestation may be in respect of the enclave 110 (per FIG. 2A), the device 120 (per FIG. 2B), or both.

Once the attestation has been performed, the enclave 110 provisions the device 120 with provisioning data.

FIG. 3 thus provides a method for provisioning the device in a trustworthy manner, even if the device 120 is not initially configured to perform the methods of FIG. 2A or 2B.

FIGS. 4A to 4D depict a more complex, full method for trustworthily provisioning a device 120. The figures show interactions between:

a device 120;

an apparatus 100 comprising an untrusted programming tool 305 and a trusted enclave 110 implementing a provisioning tool;

a silicon vendor 405 (which in this example is the vendor of the device 120);

a provisioning tool verifier 410, which is a trusted service for verifying the provisioning tool implemented by the enclave 110 (which may be provided by the vendor of the apparatus 100 or the device 120);

a silicon vendor verifier 415, which is a trusted service for verifying the silicon vendor (which may be provided by the silicon vendor itself); and a software authoriser 420, which is a trusted service for verifying authenticity of software which is to be installed onto the device.

First, some initial steps are performed, before the device 120 is shipped to a factory where the apparatus 100 is located. These steps may be performed before and/or during the manufacturing and initial configuring of the device 120 by the silicon vendor.

The software authoriser provides a software authorisation key to the silicon vendor 405, and a software authorisation token to the enclave 110. The provisioning tool verifier 410 provides a provisioning tool verification key to the silicon vendor 405. These allow for verification of software to be provisioned onto the device 120 by the enclave 110, and of the provisioning tool, as will be described below. The keys are cryptographic keys, for example asymmetric public keys, or random values of a given length.

The silicon vendor 405 provides a factory image to the programming tool 305, which will later be installed onto the device 120. The factory image includes functionality for performing subsequent tasks that will be performed by the device 120. For example, it may define the functionality for performing attestation and provisioning operations. The factory image may include the provisioning tool verifier key. The silicon vendor 405 also provides a factory image signing key with which the factory image has been signed, to the device 120, for use in later verifying the factory image. The silicon vendor 405 may also provide the software authorisation key to the provisioning tool verifier 410, for later use in verification of software.

The device 120 is then shipped to the factory, and communicatively coupled to the apparatus 100.

The (untrusted) programming tool 305 installs the factory image onto the device 120. It may also transmit the software authorisation key to the device 120. For example, this may be performed instead of providing the software authorisation key to the provisioning tool verifier 410.

The device 120 uses the factory image signing key to verify the factory image, thereby allowing it to trust that the factory image is legitimate. Subject to a successful verification, the device 120 boots the factory image.

Using functionality installed as part of the factory image, the device 120 establishes a plaintext (i.e. unencrypted connection) with the enclave 110. The device 120 uses this connection to transmit an attestation request to the enclave 110, responsive to which the enclave 110 generates and signs attestation evidence. As described in other examples, the attestation evidence may be a hash or digest of content of the enclave 110, for example data which is to be provisioned onto the device 120, or instructions which are to be executed to generate such data.

The enclave 110 transmits the signed evidence, with the software authorisation token, to the provisioning tool verifier 410. The provisioning tool verifier 410 evaluates the evidence and token for example including comparing the attestation evidence to the software authorisation token. The provisioning tool verifier then constructs and signs an attestation report indicating the outcome of the evaluation. This report is transmitted to the enclave 110, which forwards it on to the device 120. The device 120 then evaluates and verifies the report, for example by way of a trust anchor within the device 120. If the report is positive, the device 120 can trust the enclave.

Figure 4A:
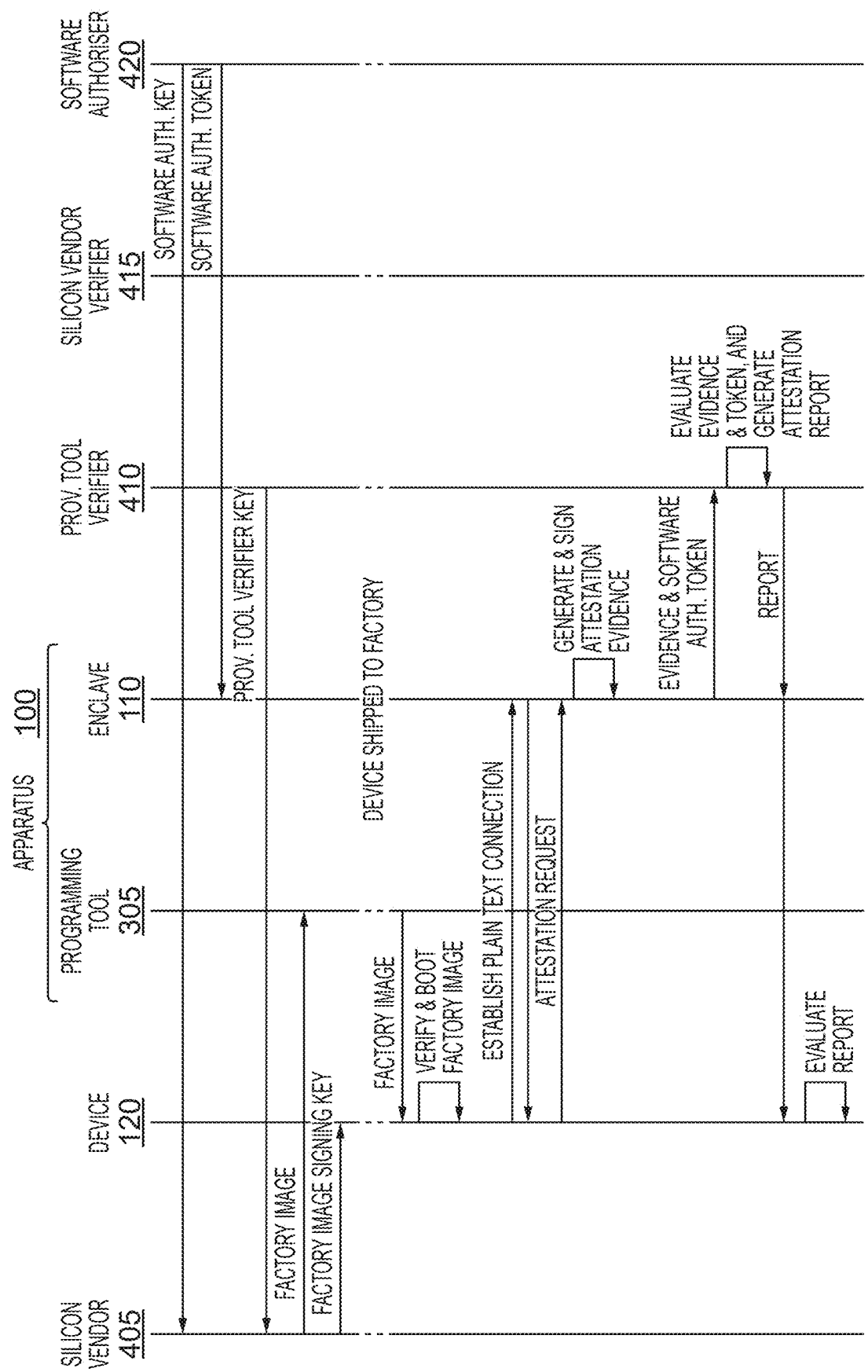
Figure 4D:
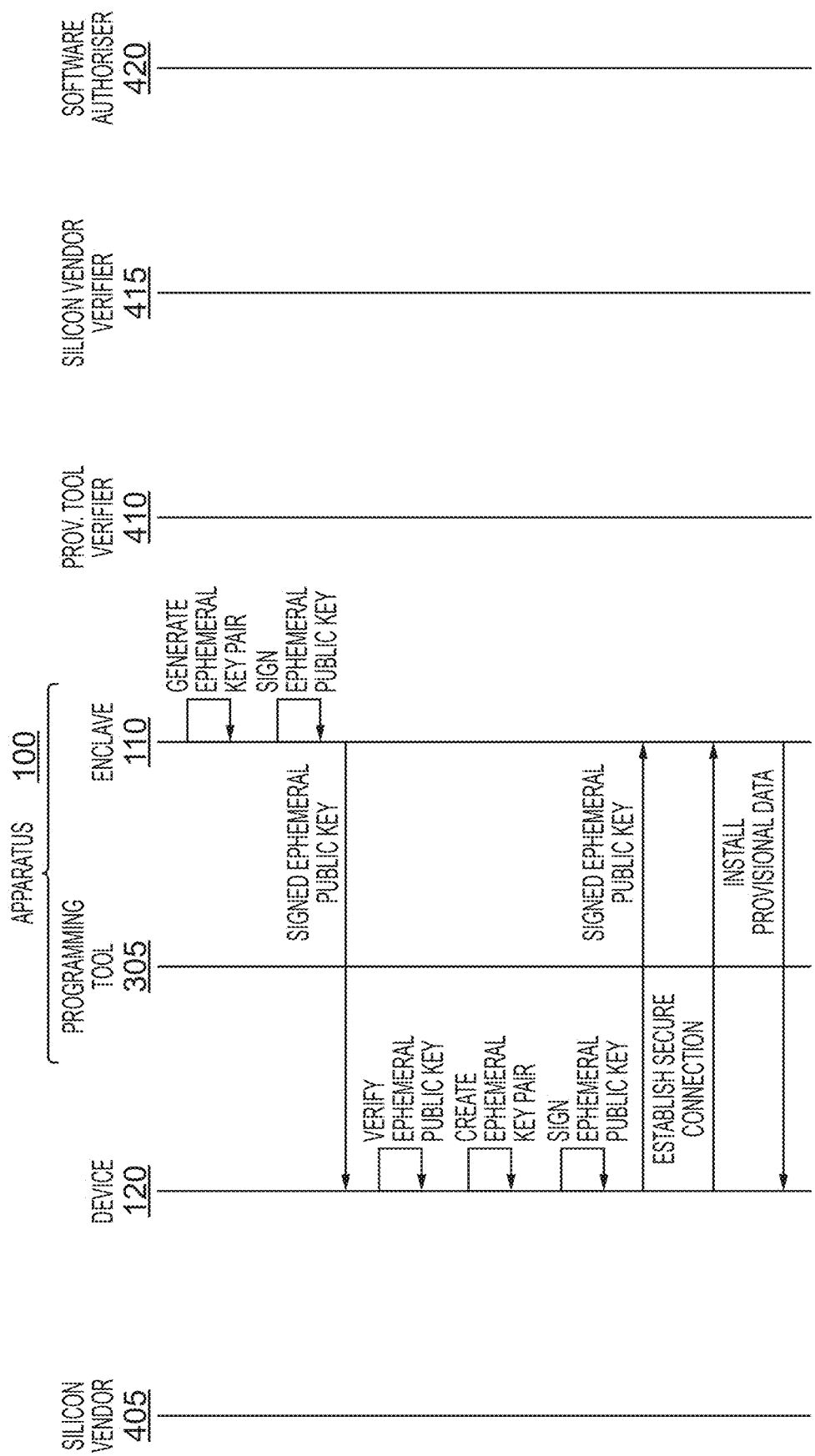

FIGS. 4B to 4D now show different methods which can be performed following a positive evaluation of the attestation report.

FIG. 4B depicts a method for establishing an entropy pool in the device 120. This entropy pool can be used for subsequent random number generation, for example generating cryptographic keys.

The enclave 110 generates and signs random data, and transmits this to the device 120. The device 120 verifies the signature, to confirm that the entropy pool can be trusted.

The device 120 then uses the received random data to establish an entropy pool, for example by combining it with locally generated entropy. This allows improved random number generation than would be achieved if a purely local entropy pool was used: as explained above, similarity of initial conditions could lead to a number of devices 120 generating the same "random" numbers.

In other examples, the entropy may instead be provided in a dedicated field of the attestation report. Alternatively the device 120 and enclave 110 may establish a secure connection, on which random data is provided.

FIG. 4C depicts a method for the device 120 to attest to its authenticity, such that the enclave can trust that it is authentic.

The enclave 110 transmits an attestation request to the device 120. The device constructs and signs attestation evidence, for example indicative of its identity and authenticity.

The device 120 transmits the signed evidence to the enclave 110, which forwards it to the silicon vendor verifier 415. The silicon vendor verifier 415 evaluates the evidence, and constructs and signs an attestation report indicating the result of the evaluation.

The silicon vendor verifier 415 transmits the report to the enclave 110, based on which the enclave 110 can confirm whether the device 120 is authentic and trustworthy. If the attestation report is negative, the enclave 110 may block further communication with the device 120.

FIG. 4D depicts a method for provisioning the device 120 with provisioning data, which may for example include cryptographic keys, trust anchors, and the like.

The enclave 110 creates an ephemeral key pair, and signs the ephemeral public key. It then transmits this to the device 120.

The device 120, in turn, verifies the ephemeral public key (for example by verifying it against a public key contained in the above-described attestation report in respect of the enclave). Subject to a successful verification, the device 120 creates its own ephemeral key pair, signs the ephemeral public key, and transmits it to the enclave 110.

Based on the exchanged ephemeral public keys, the device 120 and enclave 110 establish a secure connection.

The enclave 110 then installs the provisioning data onto the device 120, via the secure connection.

The methods of FIGS. 4A to 4D thereby allow for trustworthy configuration and provisioning of a device 120, even if the apparatus 100 is not itself trustworthy.

Figure 5:
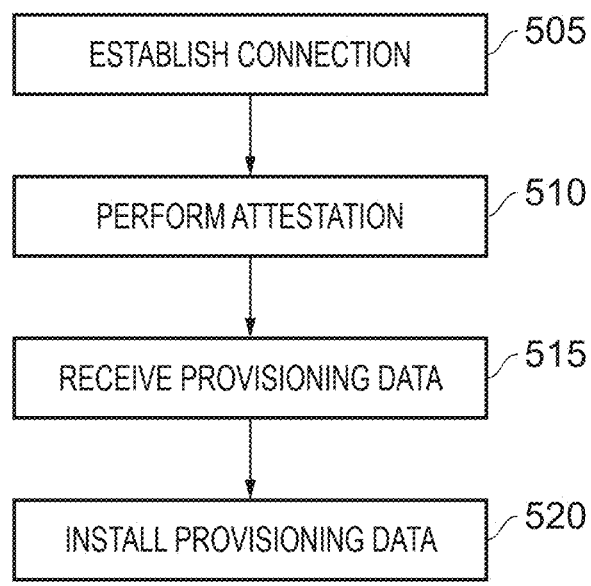
FIG. 5 depicts a method, performed by a device, according to an example.

FIG. 5 depicts a method according to an example of the present disclosure. The method may be performed by a device 120 as described above.

At block 505, a connection established to a secure enclave of a provisioning apparatus.

At block 510, an attestation process is performed in respect of the secure enclave, such that subject to a successful attestation, the enclave can be trusted.

At block 515, provisioning data is received from the secure enclave.

At block 520, the provisioning data is installed.

Apparatuses and methods are thus provided for provisioning a device.

From the above description it will be seen that the techniques described herein provides a number of significant benefits. In particular, the provisioning can be trusted, even if the apparatus that performs the provisioning is not itself trusted.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

We claim:

1. An apparatus comprising:
   interface circuitry to interface with a device that is to be provisioned by the apparatus as part of an initial configuration process of the device; and
   secure enclave circuitry to:
   maintain provisioning data with which the device is to be provisioned, the provisioning data comprising cryptographic entropy data to be used by the device to generate at least one cryptographic key;
   establish a secure connection with the device;
   perform in response to an attestation request received from the device, with the device and via the secure connection, an attestation process, and determine whether said cryptographic entropy data has not been tampered with based on the attestation process; and subsequent to successfully completing said attestation process, provisioning the device with the cryptographic entropy data, via the secure connection;

wherein the secure enclave circuitry is configured to, as part of the attestation process:
generate first attestation evidence data indicative of the provisioning data;
transmit the first attestation evidence data to an attestation verification entity;
receive, from the attestation verification entity, first attestation verification data in respect of the first attestation evidence data; and
transmit the first attestation verification data to the device; and wherein the secure enclave circuitry is configured to perform, with the device, an attestation process in respect of the device, and the secure enclave circuitry is configured, to, as part of the attestation process in respect of the device:
receive second attestation evidence data from the device, the second attestation evidence data being indicative of functionality of the device;
transmit the second attestation evidence to the attestation verification entity; and
receive, from the attestation verification entity in response to the second attestation evidence data, second attestation verification data in respect of the second attestation evidence data.

2. An apparatus according to claim 1, wherein said first attestation evidence data comprises at least one of:
data indicative of the provisioning data; and
data indicative of computer instructions to be executed by the secure enclave circuitry to generate the provisioning data.

3. An apparatus according to claim 1, wherein at least part of the first attestation verification data is cryptographically signed by the attestation verification entity.

4. An apparatus according to claim 1, comprising device programming circuitry to provision the device with functionality data defining at least one of:
secure connection functionality to establish said secure connection with the apparatus; and
attestation functionality to perform said attestation process with the apparatus.

5. An apparatus according to claim 4, wherein the functionality data comprises at least one of:
a firmware image;
a read-only memory, ROM, image; and
a bootloader.

6. An apparatus according to claim 4, wherein the functionality data is verifiable, by the device, based on verification data stored by the device.

7. An apparatus according to claim 1, wherein the provisioning data comprises secure configuration data including at least one cryptographic key to be used by the device.

8. A method comprising:
establishing a connection with secure enclave circuitry of a provisioning apparatus;
performing in response to an attestation request received from a device, with the secure enclave circuitry and via the connection, an attestation process, and determining whether provisioning data comprising cryptographic entropy data to be received from the secure enclave has not been tampered with based on the attestation process, the cryptographic entropy data to be used by the device to generate at least one cryptographic key;
subsequent to successfully completing said attestation process, receiving the cryptographic entropy data via the connection; and
installing the cryptographic entropy data as part of an initial configuration process of the device;
wherein the attestation process comprises:
generating first attestation evidence data indicative of the provisioning data;
transmitting the first attestation evidence data to an attestation verification entity;
receiving, from the attestation verification entity, first attestation verification data in respect of the first attestation evidence data; and
transmitting the first attestation verification data to the device; and
performing an attestation process in respect of the device, the attestation process in respect of the device comprising:
receiving second attestation evidence data from the device, the second attestation evidence being indicative of functionality of the device;
transmitting the second attestation evidence data to the attestation verification entity; and
receiving, from the attestation verification entity in response to the second attestation evidence data, second attestation verification data in respect of the second attestation evidence data.

9. A method according to claim 8, wherein the method further comprises:
generating local entropy data;
generating a cryptographic key based on the cryptographic entropy data and the local entropy data; and
using the cryptographic key to establish a secure connection with the secure enclave circuitry.

10. A method according to claim 8 comprising, responsive to a failure of the attestation process, blocking installation of the provisioning data.

11. A method according to claim 8, comprising:
receiving, from device programming circuitry of the provisioning apparatus, functionality data defining at least one of:
secure connection functionality to perform said establishing the secure connection with the apparatus; and
attestation functionality to perform said attestation process with the apparatus, and
installing said functionality data to permit performance of said at least one of the secure connection functionality and the attestation functionality.

12. A method according to claim 11, comprising verifying said functionality data based on pre-stored verification data.

13. A method according to claim 12, comprising receiving and pre-storing said verification data as part of a manufacturing process prior to communication with the provisioning apparatus.

14. A system comprising:
a device that is to be provisioned by an apparatus; and
said apparatus, comprising:
interface circuitry to interface with a device that is to be provisioned by the apparatus as part of an initial configuration process of the device; and
secure enclave circuitry to:
maintain provisioning data with which the device is to be provisioned, the provisioning data comprising cryptographic entropy data to be used by the device to generate at least one cryptographic key;

establish a secure connection with the device;
perform in response to an attestation request received from the device, with the device and via the secure connection, an attestation process, and determine whether said cryptographic entropy data has not been tampered with based on the attestation process; and
subsequent to successfully completing said attestation process, provisioning the device with the cryptographic entropy data, via the secure connection;
wherein the secure enclave circuitry is configured to, as part of the attestation process:
  generate first attestation evidence data indicative of the provisioning data;
  transmit the first attestation evidence data to an attestation verification entity;
  receive, from the attestation verification entity, first attestation verification data in respect of the first attestation evidence data; and
  transmit the first attestation verification data to the device; and
wherein the secure enclave circuitry is configured to perform, with the device, an attestation process in respect of the device, and the secure enclave circuitry is configured, to, as part of the attestation process in respect of the device:
  receive second attestation evidence data from the device, the second attestation evidence being indicative of functionality of the device;
  transmit the second attestation evidence data to the attestation verification entity; and
  receive, from the attestation verification entity in response to the second attestation evidence data, second attestation verification data in respect of the second attestation evidence data,
wherein said device is configured to install said cryptographic entropy data.

* * * * *